United States Patent
Lazzari et al.

(10) Patent No.: US 9,133,383 B2
(45) Date of Patent: Sep. 15, 2015

(54) MIXTURE OF INORGANIC NITRATE SALTS

(75) Inventors: Carla Lazzari, Cornaredo (IT); Tamara Passera, Casaleggio Novara (IT); Lino Carnelli, Carbonate (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 13/984,229

(22) PCT Filed: Feb. 10, 2012

(86) PCT No.: PCT/IB2012/000317
§ 371 (c)(1),
(2), (4) Date: Sep. 20, 2013

(87) PCT Pub. No.: WO2012/107834
PCT Pub. Date: Aug. 16, 2012

(65) Prior Publication Data
US 2014/0001399 A1    Jan. 2, 2014

(30) Foreign Application Priority Data

Feb. 11, 2011   (IT) .............................. MI2011A0204

(51) Int. Cl.
*C09K 3/18* (2006.01)
*C09K 5/12* (2006.01)
*F24J 2/46* (2006.01)
*F28D 20/02* (2006.01)
*F24J 2/07* (2006.01)

(52) U.S. Cl.
CPC ................ *C09K 5/12* (2013.01); *F24J 2/4649* (2013.01); *F24J 2/07* (2013.01); *F28D 20/02* (2013.01); *Y02E 10/40* (2013.01)

(58) Field of Classification Search
CPC .............. C09K 5/00; C09K 5/10; C09K 5/12; F24J 2/14; F28D 20/00; F28D 20/0056; F28D 20/02; F28D 2020/0047
USPC ....................................... 252/70, 71
See application file for complete search history.

(56) References Cited

U.S. PATENT DOCUMENTS

| | | | | |
|---|---|---|---|---|
| 2,692,234 | A | * | 10/1954 | Insinger, Jr. .................... 252/71 |
| 4,652,279 | A | * | 3/1987 | Erickson ......................... 95/191 |
| 5,244,952 | A | * | 9/1993 | Ward ............................ 524/233 |
| 5,514,226 | A | * | 5/1996 | Terrat et al. ................... 148/242 |
| 7,588,694 | B1 | | 9/2009 | Bradshaw |
| 7,828,990 | B1 | * | 11/2010 | Cordaro et al. ................. 252/71 |
| 7,922,931 | B1 | * | 4/2011 | Cordaro et al. ................. 252/71 |
| 2010/0038581 | A1 | | 2/2010 | Gladen et al. |
| 2013/0180520 | A1 | * | 7/2013 | Raade et al. ................... 126/714 |
| 2013/0264514 | A1 | * | 10/2013 | Wortmann et al. .............. 252/71 |
| 2014/0049052 | A1 | * | 2/2014 | Wortmann et al. ........... 290/1 R |

OTHER PUBLICATIONS

Bradshaw et al. "High-temperature stability of ternary nitrate molten salts for solar thermal energy systems", Solar Energy Materials 21 (1990), 51-60.*

(Continued)

*Primary Examiner* — Jane L Stanley
(74) *Attorney, Agent, or Firm* — Tarolli, Sundheim, Covell & Tummino LLP

(57) ABSTRACT

The present invention concerns a mixture of inorganic nitrate salts, comprising $LiNO_3$, $NaNO_3$, $KNO_3$ and $CsNO_3$ wherein the $LiNO_3$ content ranges from 17.5% by weight to 21.6% by weight, the NaNO3 content ranges from 10% by weight to 11% by weight, the $KNO_3$ content ranges from 27.7% by weight to 32.6% by weight, the $CsNO_3$ content ranges from 35.8% by weight to 43.8% by weight, including the interval bounds.

19 Claims, 3 Drawing Sheets

(56) References Cited

OTHER PUBLICATIONS

Robert W Bradshaw, Sandia Report, "Viscosity of Multi-component Molten Nitrate Salts—Liquidus to 200C", Sandia national labs, unlimited release Mar. 2010 online.*

Raade, Justin W., et al., "Development of Molten Salt Heat Transfer Fluid with Low Melting Point and High Thermal Stability", Solarpaces, Sep. 1, 2010.

* cited by examiner

US 9,133,383 B2

MIXTURE OF INORGANIC NITRATE SALTS

RELATED APPLICATION

This application is a National Phase filing of PCT/IB2012/000317, filed Feb. 10, 2012, which claims priority from Italian Application No. MI2011A000204, filed Feb. 11, 2011, the subject matter of which are incorporated herein by reference in their entirety.

FIELD OF THE INVENTION

The present invention concerns a mixture of inorganic nitrate salts comprising lithium nitrate, sodium nitrate, potassium nitrate and caesium nitrate in certain proportions, which can be used both as accumulator of thermal energy (TES—Thermal Energy Storage), and as heat transfer fluid (HTF—Heat Transfer Fluid) within concentrated solar power plants (CSP). Preferably the present invention may be used in thermodynamic solar systems with linear parabolic trough (Solar Trough Systems).

The present invention may furthermore be used as heat transfer fluid in a number of applications for industrial processes involving heat exchanges in a wide range of temperatures.

STATE OF THE PRIOR ART

In this description, by heat transfer fluid Applicant means a fluid for the heat exchange able to carry thermal energy, for example when it is kept flowing in a solar field, while by storage fluid it means a heat exchange fluid having the property of storing thermal energy when it is collected in at least one suitable device (for example a tank).

In Concentrated solar power technology, incident solar energy is converted into high-temperature heat using various mirror arrays. The stored heat is subsequently converted into electric energy through suitable power cycles (for example the Rankine cycle) or it is used for thermal applications. In the systems with linear parabolic troughs, direct solar radiation is concentrated through parabolic reflecting systems onto a rectilinear receiving pipe arranged just in the focus of the parabolic trough. This energy is used to heat a fluid, referred to in this description as heat transfer fluid, which flows in the receiving pipe. These systems, if combined with a suitable storage of thermal energy, are able to produce electric energy also during daylight periods when solar radiation is poor or null, such as at night-time. Heat storage requires the use of large amounts of heat transfer fluid and hence optimising the chemical-physical features thereof (such as for example large heat capacity and high thermal stability) leads to having remarkable advantages which translate into cost reduction. Commercial systems with linear parabolic troughs use, as heat transfer fluid in the receiving pipes, a mixture of organic compounds, usually diathermic oil consisting of diphenyl oxide and biphenyl. This synthetic oil has a freezing temperature equal to 12° C. and an upper working temperature limit close to 400° C. The greatest limitation linked to the use of such diathermic oil lies in the upper working temperature limit: at 400° C. thermal decomposition of the heat transfer fluid occurs, with the formation of hydrogen, carbon monoxide and light hydro-carbons. The direct consequences are twofold: the need of periodic oil replacement, the progressive loss of the vacuum in the annulus of the receiving pipe, due to the hydrogen permeation, with resulting efficiency decrease. The maximum working temperature of the diathermic oil affects directly the efficiency of the Rankine cycle limiting the temperature of the overheated steam produced at 370° C. Two further problems affect the use of diathermic oil as heat transfer fluid. Diathermic oil is volatile, so that at the maximum working temperature the vapour pressure reaches values slightly below 11 bar, as a result one is forced to keep the system pressurised with a remarkable cost for pumping the fluid. Synthetic oil cannot be disposed of in the environment since it is highly polluting. In order to increase the production of electric energy of a solar field consisting of linear parabolic troughs it is essential to equip the plant with a storage system so that it acts as heat storage. A storage system using diathermic oil, as fluid for storing energy, is generally considered too expensive for the large volumes required. Current systems aim at an "indirect heat" storage system. In said systems the heat stored by the heat transfer fluid within the solar field is transferred to a second fluid which acts as heat storage. Mixtures of molten salts may be used as fluid for storing thermal energy. These inorganic fluids offer various favourable features: they have a maximum working temperature ranging from 500° C. to 550° C. (depending on the salts used), a vapour pressure which, at the maximum temperature, is of a few millibars, and a high heat capacity (understood as the product between density and specific heat of said inorganic fluid). Various concentrated solar power plants (CSP) have been built and are already running which are provided with linear parabolic troughs which use diathermic oil within the solar field and a mixture of molten salts as storage fluid for thermal storage. Some examples are the field Andasol 1-2 near Granada in Spain, consisting of two twin plants with a nominal electric power equal to 50 MWe, each, provided with molten-salt thermal storage able to guarantee 7 hours and a half of full-load endurance; the field Extresol 1 near Torre de Miguel Sesmero in Spain. In Italy, near the combined-cycle electric power plant of Priolo Gargallo (Sicily) owned by ENEL company, the first 5-MWe plant began operating in 2010, called Archimede, wherein a mixture of molten salts is used, consisting of sodium and potassium nitrates (Hitec® Solar Salt), both as heat transferfluid within the solar field and as thermal storage. The use of molten salts as heat transfer fluid, which in the solar field reach 550° C., allows to produce steam at 530° C. and 100 bar, significantly improving the efficiency of the Rankine cycle. With these mixtures, moreover, the heat exchanger between heat transfer fluid and thermal storage fluid is removed, with an improvement in the overall efficiency.

The anhydrous compositions of molten salts currently available on the market and the ones known in the literature considered of interest for CSP applications are reported in Table 1.

TABLE 1

| $LiNO_3$ mol % | $NaNO_3$ mol % | $KNO_3$ mol % | $Ca(NO_3)_2$ mol % | — mol % | Liq. T ° C. | |
|---|---|---|---|---|---|---|
| | 50 | 50 | | | 223 | Eutectic $NaNO_3$—$KNO_3$ |
| | 66 | 34 | | | 237 | Hitec ® Solar Salt |
| | 7 | 44 | | 49 $NaNO_2$ | 141 | Eutectic comp. Hitec ® |

TABLE 1-continued

| LiNO$_3$ mol % | NaNO$_3$ mol % | KNO$_3$ mol % | Ca(NO$_3$)$_2$ mol % | — mol % | Liq. T °C. | HTF |
|---|---|---|---|---|---|---|
|  | 21 | 49 | 30 |  | 133 | Eutectic comp. Hitec ® XL |
| 30 | 18 | 52 |  |  | 120 | Eutectic LiNO$_3$—NaNO$_3$—KNO$_3$ |
| 31 |  | 58 | 11 |  | 117 | Eutectic LiNO$_3$—KNO$_3$—Ca(NO$_3$)$_2$ |
| 31-27 | 20-11 | 38-50 | 12 |  | <95 | U.S. Pat. No. 7,588,694 |
| 15 | 10 | 30 | 15 | 30 CsNO$_3$ | 65 | J. W. Raade and D. Padowitz (Solarpaces 2010) |

The only molten-salt-composition used in CSP plants is currently the binary system NaNO$_3$—KNO$_3$, a mixture marketed under the name Hitec® Solar Salt. This binary system has a high melting point, equal to 237° C., and is stable up to temperatures close to 600° C. The advantage in using this mixture of molten salts lies in its high thermal capacity and stability at high temperatures. Such a high melting point, however, limits the use of the storage system, since the temperature thereof must be maintained above 250-260° C., and implies energy consumption to keep the mixture liquid during long periods of poor or null solar radiation, where such mixture is used also as heat transfer fluid in the solar field. Particular attention must be given to the design and running of the plant so as to avoid salt solidification in the pipes of the solar field, of the power cycle and of the storage system. During the start-up large amounts of energy are required for the melting.

The Hitec® HTF mixture (Hitec® Heat Transfer Fluid) is the eutectic composition of the ternary system consisting of NaNO$_3$, KNO$_3$ and sodium nitrite. By this ternary system the melting temperature (141° C.) is remarkably reduced with respect to the binary mixture of sodium and potassium nitrates. However, the mixture is not thermally stable at high temperatures: it may be used up to about 450° C., and for a short time it is possible to reach up to 540° C. in an inert atmosphere (nitrogen blanketing) to prevent the slow conversion of nitrite in nitrate. The Hitec® XL mixture is the eutectic composition of the ternary system NaNO$_3$—KNO$_3$—Ca(NO$_3$)$_2$. This mixture has a melting temperature equal to 133° C. and, although it is thermally stable at high temperatures, the manufacturing company has decided to remove it from the market. At temperatures close to the melting temperature, the ternary system has such a high viscosity that the mixture solidifies in the form of glass. It is known, in fact, that the binary system KNO$_3$—Ca(NO$_3$)$_2$ in the composition interval ranging from 29 mol % to 48 mol % of Ca(NO$_3$)$_2$, has a glass transition instead of crystallisation (H. Senapati, K. K. Kadiyala, C. A. Angellm, *The Journal of Physical Chemistry*, vol. 95, no 18, 1991, 7050-7054). Such a property corresponds to a non-linear trend of the viscosity versus temperature in an Arrhenius-type diagram, with very high values upon approximating the melting temperature. This feature, which occurs in all the systems in which KNO$_3$ and Ca(NO$_3$)$_2$ are present, in fact prevents the use of the Hitec® XL mixture at temperatures which are below the melting temperature of the Hitec® Solar Salt (237° C.) system. Two promising ternary systems are the eutectic mixtures of lithium/sodium/potassium nitrates and of lithium/potassium/calcium nitrates, which have a melting temperature equal to 120° C. and 117° C., respectively, and a thermal stability up to the temperature of 500° C. Patent U.S. Pat. No. 7,588,694 is known to disclose anhydrous compositions belonging to the quaternary LiNO$_3$—NaNO$_3$—KNO$_3$—Ca(NO$_3$)$_2$ system, said compositions having a melting temperature below 95° C. and a high thermal stability up to the temperature of 500° C. As for the ternary Hitec® XL mixture, despite not solidifying in the form of glass, since the molar ratios between KNO$_3$ and Ca(NO$_3$)$_2$ are lower than the ones indicated for the glass transition, this system has the feature of having high viscosities at low temperatures. This physical feature, in any case due to the simultaneous presence of KNO$_3$ and Ca(NO$_3$)$_2$, in practice causes a problem when said mixtures are used especially as heat transfer fluid within the receiving pipes. Compared to the binary Hitec® Solar Salt mixture, which has a viscosity below 5 cP at 250° C., the compositions of the quaternary LiNO$_3$—NaNO$_3$—KNO$_3$—Ca(NO$_3$)$_2$ system disclosed by U.S. Pat. No. 7,588,694 have a higher viscosity, equal to 5-6 Cp at 300° C. A major object for the development of concentrated solar power systems is finding suitable molten-salt mixtures with a low melting temperature since, during the hours of poor or null solar radiation, in which the salt is nevertheless kept circulating within the solar field, the heat dissipated towards the outer environment is lower, given the lower temperature achievable by the fluid. Moreover, if the mixtures have a high viscosity at temperatures close to the melting point, as in the case of the quaternary lithium/sodium/potassium/calcium nitrate mixture (100 cP at about 120° C.), the energy advantage decreases due to the increase of the energy required for pumping the fluid. Patent U.S. Pat. No. 4,652,279 is known to disclose aqueous or anhydrous compositions for systems comprising LiNO$_3$ in an amount larger than or equal to 35 mol %, NaNO$_3$ in an amount larger than or equal to 10 mol %, KNO$_3$ in an amount larger than or equal to 10 mol %, CsNO$_3$ in an amount ranging from 0% by weight to 20% by weight and RbNO$_3$ in an amount ranging from 0% by weight to 20% by weight. The compositions can be both aqueous and anhydrous ones with a by-weight percentage variation of the water contents in the range [0 - 50]. The mixtures disclosed in U.S. Pat. No. 4,652,279 are used within absorption cycles exploiting the latent evaporation/condensation heat of the water for transferring heat at high boiling points, when containing the water component, or to dehumidify in gas drying processes at high temperatures, when the mixtures are anhydrous. A quinary anhydrous composition has recently been disclosed by J. W. Raade and D. Padowitz ("Development of molten-salt heat-transfer fluid with low melting point and high thermal stability", Solarpaces 2010) comprising 8% by weight of LiNO$_3$, 6% by weight of NaNO$_3$, 23% by weight of KNO$_3$, 44% by weight of CsNO$_3$ and 19% by weight of Ca(NO$_3$)$_2$. This mixture has a melting temperature of 65° C., a weight loss of the sample compared to the initial conditions equal to 3% following heating in air up to 561° C. and in nitrogen up to 563° C. (the analyses have been carried out through TGA with a heating rate of 10° C./min). According to authors J. W. Raade and D. Padowitz, the data concerning the thermal stability of the quinary mixture require a further experimental check. The viscosity of the disclosed composition is not known. This mixture contains a high amount of $Ca(NO_3)_2$ and the molar ratio $KNO_3/Ca(NO_3)_2$ belongs to the range shown for the glass transition. For this reason, the Applicant has carried out some experimental trials which reproduce the composition of the quinary system and during cooling the forming of a glassy phase and of a crystal phase has been detected. The viscosity trend reported in FIG. 2 confirms such behaviour. The Applicant has hence developed a new mixture of inorganic molten salts comprising $LiNO_3$, $NaNO_3$, $KNO_3$ and $CsNO_3$ having a melting temperature below 100° C., preferably in the interval from 92° C. to 93° C., a thermal stability above 500° C. and a viscosity at temperatures close to the melting point (40 cP a 120° C.) below that of the quaternary system disclosed by U.S. Pat. No. 7,588,694 and that of the quinary system published by J. W. Raade and D. Padowitz, as reported in FIG. 2. All these properties allow, in actual fact, the mixture subject of the present invention to be used not only as thermal storage fluid, allowing a higher efficiency of use of the thermal storage, but also as heat transfer fluid within the solar field. The terms mixture and composition are used as equivalents in this description.

SUMMARY OF THE INVENTION

The present invention concerns a mixture of inorganic nitrate salts, comprising $LiNO_3$, $NaNO_3$, $KNO_3$ and $CsNO_3$ wherein the contents of $LiNO_3$ ranges from 17.5% by weight to 21.6% by weight, the contents of $NaNO_3$ ranges from 10% by weight to 11% by weight, the contents of $KNO_3$ ranges from 27.7% by weight to 32.6% by weight, the contents of $CsNO_3$ ranges from 35.8% by weight to 43.8% by weight, including the interval bounds. The present invention furthermore concerns the use of the mixture of inorganic salts as described and claimed in the present description for transferring and/or storing thermal energy (heat), preferably in concentrated solar power plants, even more preferably concentrated solar power plants with linear parabolic troughs. The melting temperature of said mixture below 100° C. advantageously causes a reduction of the heat loss to keep liquid the thermal exchange fluid with a resulting cost reduction over currently known systems. The opportunity of using molten-salt mixtures with a low melting temperature is an advantage, since, during the hours of low or null solar radiation, in which the salt is nevertheless maintained flowing within the solar field, the heat dissipated into the outer environment is lower, considering the lower temperature reached by the fluid.

The mixtures subject of the present invention have a viscosity lower than similar known quaternary mixtures, thus allowing to use these innovative mixtures as energy "storage", but especially also as heat transfer fluid in the receiving pipes of the CSP plants, in particular those employing linear parabolic troughs. Similarly, the mixtures subject of the present invention also have a viscosity lower than the quinary nitrate mixture disclosed by J. W. Raade and D. Padowitz, according to the experimental measurements carried out by the Applicant to determine the viscosity of the published quinary composition and reported in FIG. 2. A low viscosity, at low temperature, allows recirculating the heat transfer fluid in the receiving pipes during periods having insufficient or no solar radiation, so as to avoid formation of solid agglomerates in the pipes, without using high energy for the pumping of the fluid.

BRIEF DESCRIPTION OF THE DRAWINGS

Further objects and advantages of the present invention will be clearer from the following description and from the attached drawings, provided purely as a non-limiting example, wherein.

DETAILED DESCRIPTION OF THE PREFERRED EMBODIMENTS

Figure 1:
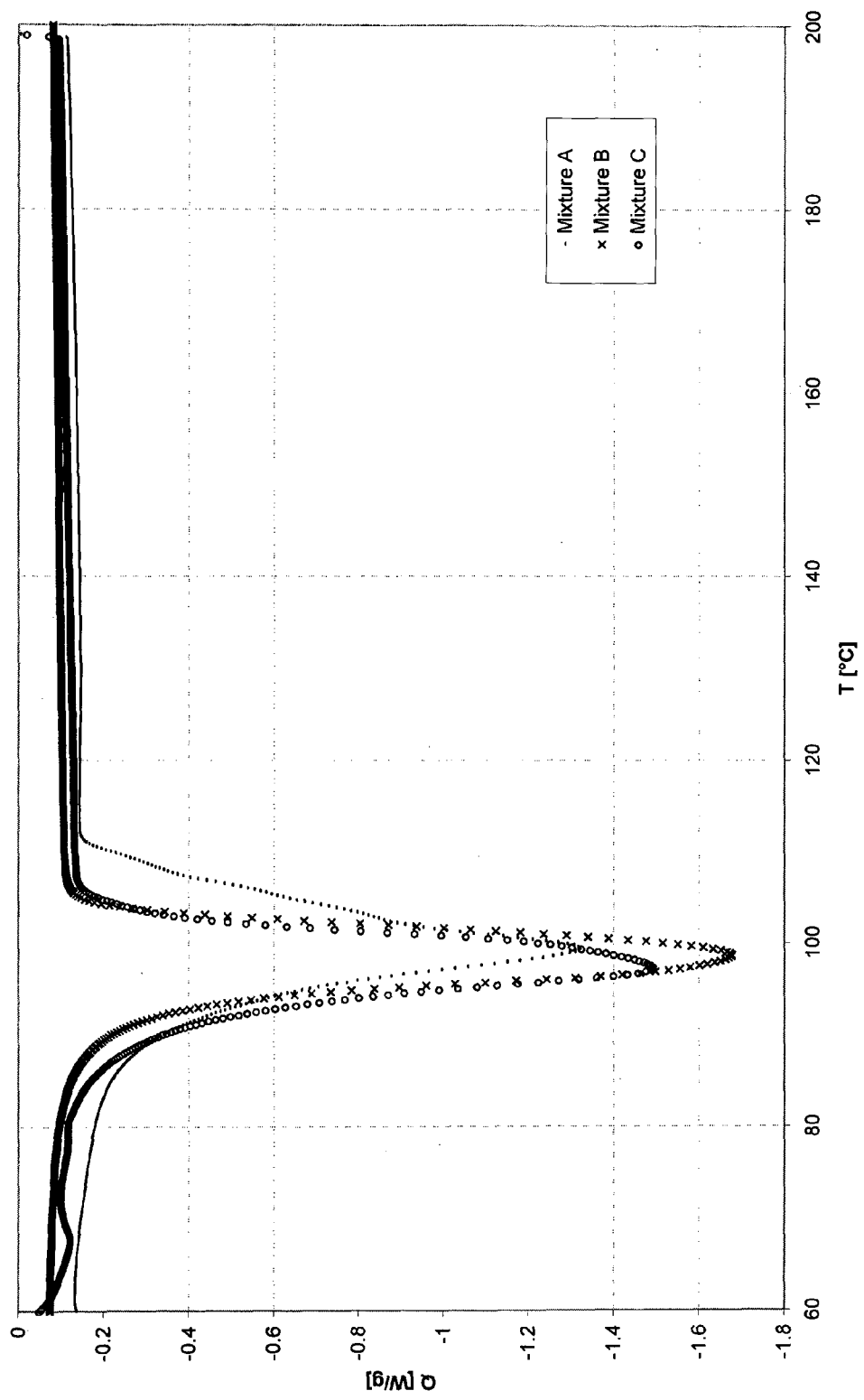
FIG. 1 show the DSC (Differential Scanning calorimetry—Mettler 822) analysis of the compositions indicates as Mixture A, Mixture B and Mixture C reported in Table 3.

An embodiment of the present invention is a mixture of inorganic nitrate salts comprising $LiNO_3$, $NaNO_3$, $KNO_3$ and $CsNO_3$ having a solid-liquid phase-transition temperature lower than 100° C., low viscosity, low melting heat, which features are essential for optimising the efficiency of a solar field using molten salts as heat transfer fluid which is able to transfer and/or store thermal energy. $LiNO_3$ and $CsNO_3$ nitrates, added to the binary $NaNO_3$—$KNO_3$ system, reduce the melting temperature by about 130° C. The simple mixing in arbitrary proportions of these four nitrates does not lead to obtain compositions having a low solidification point, a fundamental feature for a heat transfer fluid. In the composition subject of the present invention, $LiNO_3$ ranges from 17.5% by weight to 21.6% by weight, $NaNO_3$ ranges from 10% by weight to 11% by weight, $KNO_3$ ranges from 27.7% by weight to 32.6% by weight, $CsNO_3$ ranges from 35.8% by weight to 43.8% by weight, including the interval bounds. Preferably, in the composition subject of the present invention, the contents of $LiNO_3$ range from 17.5% by weight to 19.5% by weight, the contents of $NaNO_3$ range from 10.5% by weight to 11% by weight, the contents of $KNO_3$ range from 27.7% by weight to 30.1% by weight, the contents of $CsNO_3$ range from 39.9% by weight to 43.8% by weight, including the interval bounds. Preferred mixtures are the ones in which the $LiNO_3$ contents are 31.1 mol %, the contents of $NaNO_3$ are 13.6 mol %, the contents of $KNO_3$ are 32.27 mol %, the contents of $CsNO_3$ are 22.5 mol %. Even more preferred mixtures are the ones in which the $LiNO_3$ contents are 33.4 mol %, the contents or $NaNO_3$ are 12.5 mol %, the contents of $KNO_3$ are 34.4 mol %, the contents of $CsNO_3$ are 19.6 mol %. Even more preferred mixtures are the ones in which the contents of $LiNO_3$ are 28.8 mol %, the contents of $NaNO_3$ are 14.7 mol %, the contents of $KNO_3$ are 31.1 mol %, the contents of $CsNO_3$ are 25.4 mol %. The innovative idea of the present invention consists in having identified a range of compositions for the quaternary $LiNO_3$—$NaNO_3$—$KNO_3$—$CsNO_3$ system within which the mixtures have a melting point below 100° C., which preferably ranges in the interval 92-93° C. The mixtures subject of the present invention undergo a weight loss equal to 3% of the initial weight at 615° C., preferably a weight loss below 3% of the initial weight at 610° C., due to the heating of the mixtures at 10° C./min in inert atmosphere. The weight loss of said mixtures is negligible for temperatures equal to 500° C. The viscosity of the described and claimed mixtures is below 60 cP at 110° C. The heat of fusion of the identified mixtures is about 75 kJ/kg; such mixtures have high thermal capacity, low vapour pressure at high temperatures, are chemically stable in contact with the air and are non-corrosive. The above-described technical features can belong simultaneously to the mixtures subject of the present invention. Considering the melting temperature values and especially the viscosity values as indicated in this description, the mixtures subject of the present invention allow to advantageously limit night-time thermal dispersions, being able to flow in the solar field at lower temperatures than those of known systems, to limit electric energy consumptions for pumping, to limit electric energy consumptions for maintaining the salts molten, to increase the efficiency of the Rankine cycle being able to work at high temperatures, to improve the exploitation of the heat storage having available a wider range of temperatures ranging from 110° C. to 550° C. All these aspects increase the efficiency of the conversion of solar energy into electric energy. Moreover, the low melting point and low heat of fusion advantageously reduce the energy required both for the starting up of the plant and during the scheduled or unexpected maintenance stops. Moreover, preventing salt solidification in the pipes of the solar field, of the power cycle and of the storage system, is less problematic. Due to a melting point ranging in the interval 92-93° C., the thermal and/or electric energy used for maintaining liquid the heat transfer fluid is reduced, with a resulting cost reduction over the binary Hitec® Solar Salt system (the only mixture currently used in CSP applications). Compared to the quaternary $LiNO_3$—$NaNO_3$—$KNO_3$—$Ca(NO_3)_2$ system disclosed by U.S. Pat. No. 7,588,694 and the quinary $LiNO_3$—$NaNO_3$—$KNO_3$—$Ca(NO_3)_2$—$CsNO_3$ system disclosed by J. W. Raade and Padwotz which have a melting temperature below 95° C., the $LiNO_3$—$NaNO_3$—$KNO_3$—$CsNO_3$ system subject of the present invention has the feature of having significantly lower viscosity across the whole range of temperatures in which it is possible to use the mixtures, 110°-550° C. Due to this physical property a further embodiment of the present invention is the use of the mixtures for transferring and/or storing thermal energy (heat), i.e. as "storage" fluid storing thermal energy and/or as heat transfer fluid. Preferably said mixtures are used for transferring and/or storing thermal energy (heat) in the receiving pipes of the CSP plants and even more preferably in plants with linear parabolic troughs. A further aspect of the present invention is a heat transfer and/or storing fluid comprising the mixtures described and claimed in this description, having the property of exchanging thermal energy in a solar field. A further aspect of the present inventive concept is a concentrated solar power plant, preferably with linear parabolic troughs, comprising at least one receiving pipe wherein said heat transfer fluid flows, and/or at least one collection device wherein said storage fluid is stored. Another important feature of the quaternary system subject of the present invention is that all the described and claimed mixtures are subject to the phenomenon of sub cooling: below the melting temperature it is possible to observe the presence of sub cooled liquid. If the system is not disturbed, crystallisation begins at temperatures lower by 30° C. than the melting temperature. The mixtures subject of the present invention are sufficiently stable at temperatures above 500° C. Compared to diathermic oil, which is thermally stable up to 400° C., the use of a heat transfer fluid with greater thermal stability at higher temperatures allow to improve the efficiency of the Rankine cycle with a resulting increase of the production of electric energy. The mixtures subject of the present invention do not have immiscibility gaps. Comparing said mixtures with the diathermic oil which at the moment is the heat transfer fluid most used in the CSP technology with linear parabolic troughs, it is possible to state that:

said mixtures of molten salts, if dispersed in the environment, are not as polluting as the diathermic oil, which is classified as dangerous for the environment (environmental contact with these last agents or preparations may cause damages to the ecosystem in the short or in the long term);

said mixtures of molten salts have a high density and a high thermal capacity, which allow to flow a smaller flow rate in the solar field compared to thermal oil, decreasing the pressure drops in the circuit and consequently reducing fluid pumping costs;

said mixtures of molten salts allow to operate with high temperature gradients both in the solar field and in the storage system remarkably improving the efficiency thereof;

said mixtures of molten salts can operate at high temperatures which, as known, improve the efficiency of the power cycle;

said mixtures of molten salts have a vapour pressure virtually close to zero which allows to store the fluid at atmospheric pressure, while diathermic oil, having a high vapour pressure at the working temperatures, needs to be stored in pressurized tanks, by blowing a large amount of nitrogen therein;

said mixtures of molten salts are chemically stable in contact with air.

A further embodiment of the invention concerns a process for preparing the inorganic nitrate salt mixtures subject of the present invention. Two are the possible preferred processes. A preferred process comprises the following steps:

optionally drying in a temperature range comprised from 100° C. to 150° C. under vacuum and for a time ranging from 8 to 15 hours the individual $LiNO_3$, $NaNO_3$, $KNO_3$ and $CsNO_3$ salts having a purity exceeding 99%, mixing said possibly dried salts so as to obtain the mixtures described and claimed in the present description.

A second preferred process for the preparation of the mixtures subject of the present invention comprises the following steps:

mixing the individual $LiNO_3$, $NaNO_3$, $KNO_3$ and $CsNO_3$ salts having a purity exceeding 99% so as to obtain the mixtures described and claimed in the present description, possibly drying in temperature range comprised from 100° C. to 150° C. under vacuum and for a time ranging from 8 to 15 hours said mixtures.

A method has been used for identifying the lowest melting point of a mixture of inorganic salts comprising $LiNO_3$, $NaNO_3$, $KNO_3$ and $CsNO_3$. Said method comprises the steps of:

fully melting said mixture so as to guarantee the homogeneity thereof, taking at least one sample of said molten mixture and perform a calorimetric analysis in inert atmosphere heating and cooling said sample at a rate ranging from 1° C./min to 20° C./min, preferably 10° C./min, so as to identify the melting-start temperature thereof and to identify, through calorimetric graphs, the compositions to which correspond a higher percentage of mixture provided with low melting point, reproducing at least one of the identified compositions and fully melting said composition, then cooling it down to the melting-start temperature, standing said composition for at least 5 hours so that it reaches thermodynamic equilibrium, drawing at least 50 mg or the remaining liquid and, finally, performing the analysis of the composition of the liquid drawn through ICP-OES emission spectrometry.

Using this method the composition interval reported in Table 2 has been found, which shows a melting point of 92° C.-93° C. and in particular the mixtures A, B and C reported in the Table 3 of Example 1.

TABLE 2

| % BY WEIGHT | COMPOUND |
|---|---|
| 17.5-21.6 | $LiNO_3$ |
| 10.0-11.0 | $NaNO_3$ |
| 27.7-32.6 | $KNO_3$ |
| 35.8-43.8 | $CsNO_3$ |

The calorimetric tests have been repeated and the heat profiles recorded for mixtures A, B and C of Table 3 highlight a sharp melting phenomenon. This result allows concluding that for the quaternary $LiNO_3$—$NaNO_3$—$KNO_3$—$CsNO_3$ system a whole area of composition exists wherein the solid-liquid phase transition occurs at a temperature ranging from 92° C. to 93° C. as indicated in FIG. 1. There is hence no single composition characteristic of the eutectic point, as occurs for binary and ternary mixtures, but multiple mixtures exist which show the lowest melting temperature compared to the other compositions. Another feature is that the analysed compositions are subject to the phenomenon of sub cooling. The liquid-solid phase transition, if the system is not disturbed, occurs at about 30° C. below the melting temperature. Moreover, all investigated compositions do not show a glass transition phase.

EXAMPLE 1

Mixtures Employed in the Experimentation

Table 3 reports the mixtures prepared and analysed experimentally.

TABLE 3

| | UNIT OF MEASUREMENT | VALUE |
|---|---|---|
| MIXTURE A | | |
| $LiNO_3$ | mol % | 33.4 |
| $NaNO_3$ | mol % | 12.5 |
| $KNO_3$ | mol % | 34.4 |
| $CsNO_3$ | mol % | 19.6 |
| MIXTURE B | | |
| $LiNO_3$ | mol % | 31.1 |
| $NaNO_3$ | mol % | 13.6 |
| $KNO_3$ | mol % | 32.7 |
| $CsNO_3$ | mol % | 22.5 |
| MIXTURE C | | |
| $LiNO_3$ | mol % | 28.8 |
| $NaNO_3$ | mol % | 14.7 |
| $KNO_3$ | mol % | 31.1 |
| $CsNO_3$ | mol % | 25.4 |

Figure 2:
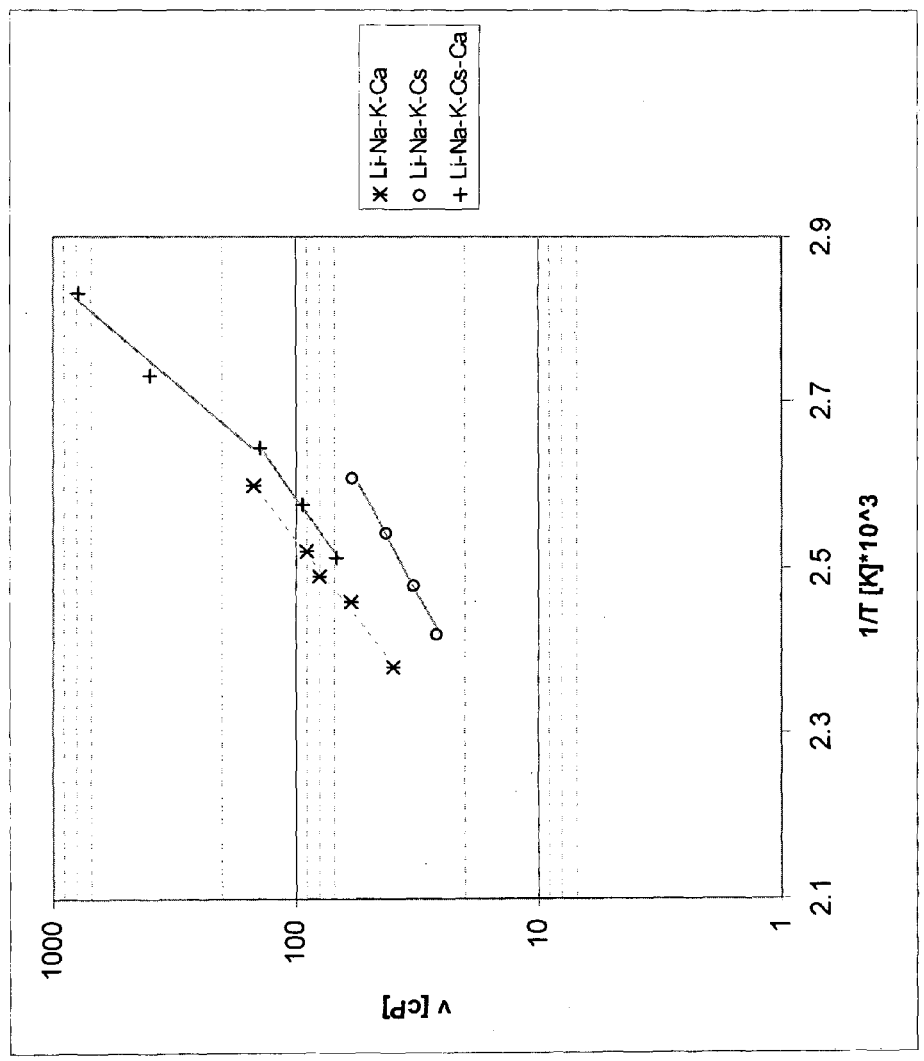
FIG. 2 shows the viscosity measurement of the mixture C reported in Table 3, of the quaternary system comprising $LiNO_3$, $NaNO_3$, $KNO_3$ and $Ca(NO_3)_2$ disclosed by U.S. Pat. No. 7,588,694 and of the quinary system comprising $LiNO_3$, $NaNO_3$, $KNO_3$, $Ca(NO_3)_2$, and $CsNO_3$ disclosed by J. W. Raade and D. Padowitz.
Figure 3:
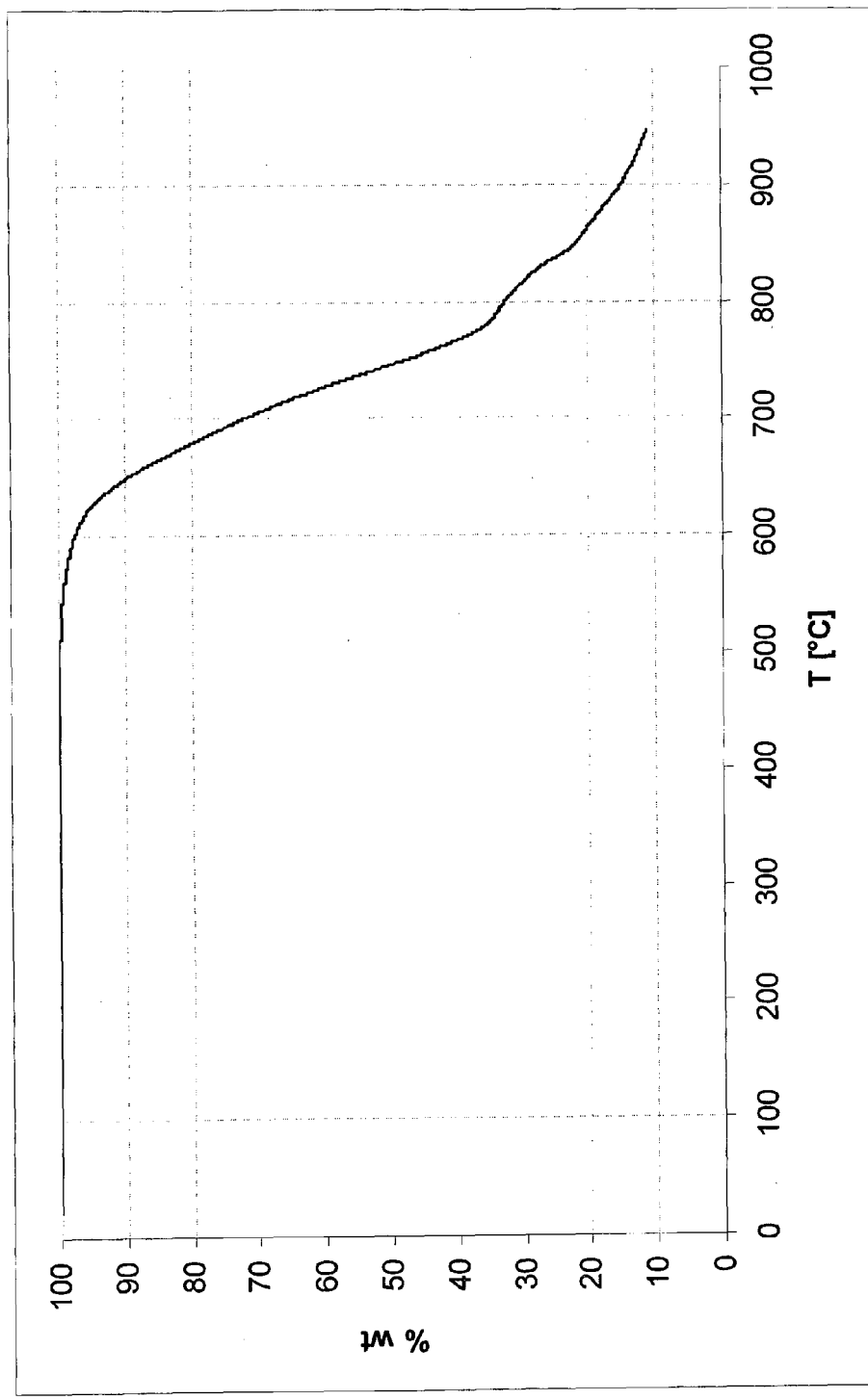
FIG. 3 shows the thermo-gravimetric analysis of the mixture C reported in Table 3.

The melting point of the quaternary mixtures reported in Table 3 has been experimentally set. The mixtures of nitrate salts have been prepared starting from pure $NaNO_3$, $KNO_3$, $LiNO_3$, $CsNO_3$ salts having title >99%, previously dried in an oven at 150° C. under vacuum for one night. Samples of about 10 g quaternary mixtures with known composition have been fully melted in an oven so as to guarantee the homogeneity of the sample itself and to perform the drawing of liquid solutions (about 5 mg) to undergo DSC (Differential Scanning calorimetry—Mettler 822) analysis and so as to identify their melting-start temperature by using the GEFTA direct method. The calorimetric analyses have been performed in inert atmosphere heating and cooling the samples at 10° C./min. From the analysis of the calorimetric graphs the compositions have been identified to which correspond a higher percentage of mixture provided with low melting point. Such compositions have been reproduced in 10 g samples, placed in an oven and, after complete melting, cooled down to the minimum temperature identified by the DSC tests. A 5-hour period has been waited to allow the phases formed in each sample to reach thermodynamic equilibrium and a representative amount of the remaining liquid has been drawn. The analysis of the composition of the drawn samples has been performed through ICP-OES emission spectrometry. Thereby a melting point of 92°-93° C. has been detected for mixtures A, B and C, the composition of which is reported in Table 3. The calorimetric tests have been repeated and the thermal profiles recorded for mixtures A, B and C highlight a sharp melting phenomenon as shown in FIG. 1. It has been observed that the analysed samples are subject to the sub cooling phenomenon. The liquid—solid phase transition, if the system is undisturbed, occurs at about 30° C. below the melting temperature. Moreover, all the investigated mixtures do not show a glass transition phase. Viscosity measurements have been carried out in the temperature range from 110° to 150° C. with the viscosimeter Brookfield DV-II on 15 g samples for mixture C. The results obtained are reported in FIG. 2 and compared with the viscosity values of the low-melting mixtures belonging to the quaternary $LiNO_3$—$NaNO_3$—$KNO_3$—$Ca(NO_3)_2$ system, data published in patent U.S. Pat. No. 7,588,694, and of the quinary $LiNO_3$—$NaNO_3$—$KNO_3$—$Ca(NO_3)_2$—$CsNO_3$ system, the viscosity measurements of which have been carried out on 15 g samples having composition equal to the one disclosed by J. W. Raade and D. Padowitz in the temperature range from 80° to 125° C. The thermal stability of the identified mixture C has been assessed through TGA (Thermogravimetry Analysis—Perkin Elmer Thermal Analysis TGA 7) tests. The results obtained are reported in FIG. 3. The studied mixtures begin to lose weight at temperatures above 500° C. From the thermogravimetric analysis, performed in nitrogen atmosphere with a heating rate of 10° C./min, a weight loss of the sample equal to 3% by weight was detected, compared to the initial situation, for temperatures close to 615° C.

The invention claimed is:

1. A mixture of inorganic nitrate salts, comprising: $LiNO_3$, $NaNO_3$, $KNO_3$ and $CsNO_3$ wherein the $LiNO_3$ content ranges from 17.5% by weight to 21.6% by weight, the $NaNO_3$ content ranges from 10% by weight to 11% by weight, the $KNO_3$ content ranges from 27.7% by weight to 32.6% by weight, and the $CsNO_3$ content ranges from 35.8% by weight to 43.8% by weight.

2. The mixture according to claim 1, wherein the $LiNO_3$ content ranges from 17.5% by weight to 19.5% by weight, the $NaNO_3$ content ranges from 10.5% by weight to 11% by weight, the $KNO_3$ content ranges from 27.7% by weight to 30.1% by weight, and the $CsNO_3$ content ranges from 39.9% by weight to 43.8% by weight.

3. The mixture according to claim 1, wherein the melting point temperature is lower than 100° C.

4. The mixture according to claim 3, wherein the melting point temperature ranges from 92° C. to 93° C.

5. The mixture according to claim 1, wherein the weight loss is equal to 3% with respect to the initial weight at a temperature equal to 615° C.

6. The mixture according to claim 5, wherein the weight loss is lower than 3% with respect to the initial weight at a temperature equal to 610° C.

7. The mixture according to claim 1, wherein the viscosity is lower than 60 cP at 110° C.

8. The mixture according to claim 1, wherein the melting temperature ranges from 92° C. to 93° C., the viscosity is lower than 60 cP at 110° C. and the weight loss is zero at a temperature equal to 500° C.

9. The mixture according to claim 1, consisting essentially of 33.4 mol % of $LiNO_3$, 12.5 mol % of $NaNO_3$, 34.4 mol % of $KNO_3$, and 19.6 mol % of $CsNO_3$.

10. The mixture according to claim 1, consisting essentially of 31.1 mol % of $LiNO_3$, 13.6 mol % of $NaNO_3$, 32.27 mol % of $KNO_3$, and 22.5 mol % of $CsNO_3$.

11. The mixture according to claim 1, consisting of 28.8 mol % of $LiNO_3$, 14.7 mol % of $NaNO_3$, 31.1 mol % of $KNO_3$, and 25.4 mol % of $CsNO_3$.

12. The mixture according to claim 1, being used to transfer and/or store thermal energy.

13. The mixture according to claim 12, being used to transfer and/or store thermal energy in concentrated solar power plants.

14. The mixture according to claim 13, being used to transfer and/or store thermal energy in concentrated solar power plants with linear parabolic troughs.

15. A heat transfer and/or thermal-energy storage fluid comprising the mixture according to claim 1.

16. The heat transfer and/or thermal-energy storage fluid according to claim 15 being used in a heat transfer process that operates in the temperature range from 110° C. to 550° C.

17. The heat transfer and/or thermal-energy storage fluid according to claim 15 being used in a concentrated solar power plant, the concentrated solar power plant comprising at least a receiving pipe wherein the heat transfer fluid flows, and/or at least a collecting device wherein the thermal energy storage fluid is accumulated.

18. The heat transfer and/or thermal-energy storage fluid according to claim 15 being used in a concentrated solar power plant, the concentrated solar power plant including linear parabolic troughs that comprise at least a receiving pipe wherein the heat transfer fluid flows, and/or at least a collecting device wherein the thermal energy storage fluid is accumulated.

19. A process to prepare a mixture of inorganic nitrate salts according to claim 1, comprising at least one of the following steps:
 drying in a temperature range comprised from 100° C. and 150° C. under vacuum and for a time which ranges from 8 to 15 hours the single $LiNO_3$, $NaNO_3$, $KNO_3$ and $CsNO_3$ salts having a purity higher than 99%; and
 mixing the single $LiNO_3$, $NaNO_3$, $KNO_3$ and $CsNO_3$ salts having a purity higher than 99% so as to obtain the mixtures according to claim 1.

* * * * *